3,461,072
FERRIMAGNETIC MATERIAL FOR USE AT FREQUENCIES HIGHER THAN 50 MC./SEC. HAVING REDUCED LOSS FACTOR AND HIGHER QUALITY FACTOR

Gerhard Winkler, Hamburg, Germany, assignor, by mesne assignments, to U.S. Philips Corporation, a corporation of Delaware
No Drawing. Filed Mar. 31, 1966, Ser. No. 538,992
Claims priority, application Germany, May 10, 1965, P 36,751
Int. Cl. C04b 35/26, 35/64; H01f 1/10
U.S. Cl. 252—62.59  2 Claims

ABSTRACT OF THE DISCLOSURE

A ferrimagnetic material for use at frequencies exceeding 50 mc./sec. having a higher resonance frequency, a reduced loss factor (tan $\delta$) and an increased quality factor ($\mu'Q = \mu'/\tan \delta$, $\mu'$ being the initial permeability) as compared with a known material. The material consists of crystals having the composition $$Ba_{3-a-b-c}Sr_aPb_bCa_cMe_{2-d}{}^{II}Co_{(d+e)}{}^{II}Ti_e{}^{IV}Fe_{24-2e}{}^{III}O_{41}$$

while the known material is the same composition without Ti. Bodies may be formed which are magnetically anisotropic and in which the basal planes of the crystals are parallel to one another.

---

The invention relates to a method of producing ferrimagnetic material for use at high frequencies (particularly at least 50 mc./sec.). The invention furthermore relates to molded ferrimagnetic bodies made of a material produced by said method.

From British patent specification 833,053 there is known a class of ferrimagnetic materials consisting of crystals or mixed crystals of compounds of a chemical composition according to the formula $$Ba_{(3-a-b-c)}Sr_aPb_bCa_cMe_{(2-d)}{}^{II}Co_d{}^{II}Fe_{24}{}^{III}O_{41} \quad (1)$$

wherein $Me^{II}$ designates at least one of the bivalent metals of the group of $Mn^{II}$, $Fe^{II}$, $Ni^{II}$, $Cu^{II}$, Zn and Mg or the bivalent complex $$Li^I + Fe^{III}/2$$

while $$0 \leq a \leq 1$$
$$0 \leq b \leq 0.6$$
$$0 \leq c \leq 0.3$$

and $$0 \leq d \leq 2$$

the crystals and the mixed crystals having a crystal structure, whose elementary cell in the hexagonal crystal system can be described by a $c$-axis of about 52.3 A. and an $a$-axis of about 5.9 A. As it appears from said patent specification these materials, which have useful electromagnetic properties in various respects, may be considered, as far as $a$, $b$ and $c$ are not all at the same time equal to zero and, moreover $d$ is not equal to 2, as being derived by substitution from the compound of the chemical composition according to the formula:

$$Ba_3Co_2{}^{II}Fe_{24}{}^{III}O_{41}$$

which compound is described in British patent specification 839,860.

As far as in the Formula 1 the magnitude $d$ has a value of at least 0.5, the crystals (or mixed crystals) of the relevant compounds have a negative crystal anisotropy constant $K_1'$, which means that the direction of the spontaneous magnetisation is at right angles to the hexagonal crystal axis and hence parallel to the basis plane of the crystal. In this case the crystal has a so-called preferential plane of magnetisation, in which plane the magnetization direction can be much more readily turned than away from said plane in a direction not located in said plane. Materials consisting of such crystals are distinguished by a very high resonance frequency, which means that even at very high frequencies of 50 to 1000 mc./sec. they exhibit comparatively high values of the initial permeability and comparatively low electromagnetic losses, so that they are suitable for use as construction elements for ferrimagnetic bodies for the concentration of magnetic lines of force.

It has now been found that the electromagnetic properties of the materials described above may be considerably improved in the sense of a further rise of the resonance frequency, a further reduction of the magnetic loss factor tan $\delta = \mu''/\mu'$ and a further rise of the quality factor $\mu' \cdot Q = \mu'/\tan \delta$ (wherein $\mu'$ is the real value of the initial permeability) by replacing in the compounds of the chemical composition according to the Formula 1, part of the $Fe^{III}$-ions pairwise by the combination of a $Co^{II}$-ion and a $Ti^{IV}$-ion so that compounds of a chemical composition according to the formula:

$$Ba_{(3-a-b-c)}Sr_aPb_bCa_cMe_{(2-d)}{}^{II}Co_{(d+e)}{}^{II}$$
$$Ti_e{}^{IV}Fe_{(24-2e)}{}^{III}O_{41} \quad (2)$$

are obtained, wherein the symbols $a$, $b$ and $c$ have the same meanings as in Formula 1, while $$0.5 \leq d \leq 2$$

and $$0.1 \leq e \leq 2.0$$

The substitution of the combination of a $Co^{II}$-ion and a $Ti^{IV}$-ion for a pair of $Fe^{III}$-ions in quantities lying within the limits indicated by the Formula 2 does not change the crystal structure.

The novel ferrite material is produced by methods known per se for the production of ferrimagnetic ferrites by heating, preferably by sintering, a finely divided starting mixture of the relevant metal oxides, which may be replaced wholly or partly by compounds converted by heating into the metal oxides and/or by previously formed reaction products of two or more of the ferrite-forming metal oxides. If desired, the finely divided starting mixture is first presintered, after which the reaction product is ground to fineness and the powder obtained is again sintered; this sequence of operations may be repeated once or several times. The temperature of the presintering and the final sintering processes is preferably chosen between, for example, about 1000° C. and about 1450° C., preferably between 1200° C. and 1350° C. Presintering and final sintering are preferably carried out in an oxygen containing atmosphere, for example in air.

For carrying out or facilitating this method sintering agents, for example silicates and/or fluorides may be added. Ferrimagnetic bodies consisting of the materials described may be manufactured by sintering the basic material directly in the desired shape or by grinding the reaction product of presintering to fineness and by shaping it in the desired form, if necessary after the addition of a binder, after which either the shaped body is finally sintered or the binder is hardened.

The ferrite material described may, as an alternative, be produced by a melting process or by causing monocrystals to crystallize from a melt.

The magnetic properties of ferrimagnetic bodies consisting of ferrite materials produced in accordance with the invention may be further improved by carrying out a preferred variant of the method according to the invention in which the particles of the powdery ferrite material, in the state in which they are still movable relative to each other, are orientated in a rotating magnetic field and united, usually by compression, in the magnetically orientated state, to form a coherent body. It is thus ensured that a great majority of the crystals is orientated so that their hexagonal basal planes of easy magnetizability (preferential magnetic planes) are relatively parallel, that is to say parallel to the plane of the rotating magnetic field. This magnetic orientation brings about an increase in initial permeablity and in quality factor.

From British patent specification 833,007, pages 1265 to 1267, April 1963, there are known compounds of a composition according to one of the formulae:

$$BaCo_a^{II}Ti_a^{IV}Fe_{(12-2a)}^{III}O_{19}$$

wherein $1.0 < a < 1.6$ and the Ba-ion may be replaced wholly or partly by Sr-ion, Pb-ion and/or, for at the most 40 atom percent by the Ca-ion. These compounds may be considered as being derived from the compound:

$$BaFe_{12}^{III}O_{19}$$

By replacing part of the trivalent iron ions pairwise by the combination of a cobalt ion and a titanium ion. These compounds were found to have a strong planar anisotropy. A similar substitution takes place in the scope of the present invention, but the substitution takes place in compounds of the composition according to the formula 1, which differs considerably from the composition according to the formula:

$$BaFe_{12}^{III}O_{19}$$

It could not be predicted that by the aforesaid substitution according to the invention the combination of $$(Co^{II} + Ti^{IV})$$

for trivalent iron in a system having a composition differing significantly from $BaFe_{12}^{III}O_{19}$ materials could be obtained which have materially improved electro-magnetic properties at frequencies lying between 50 and 1000 mc./sec.

The invention will be described with reference to the following illustrative examples.

EXAMPLE 1

A mixture of iron oxide $Fe_2O_3$, barium carbonate, $BaCO_3$, cobalt carbonate, $CoCO_3$, zinc oxide, ZnO, and titanium dioxide, $TiO_2$, of a composition such that the quantities of the metals have a ratio like in the compound of the compostion according to the formula:

$$Ba_3Co_{1.225}^{II}Zn_{1.275}Ti_{0.5}^{IV}Fe_{23}^{III}O_{41}$$

was ground in a ball mill with alcohol for 15 hours. The solid substance was then filtered off and dried and subsequently presintered in air at 1300° C. twice for one hour, while in the interval between the two presintering processes the substance was again ground. After the second presintering process grinding was resumed for 15 hours, after which a molded body was pressed from the resultant powder, which body was sintered in pure oxygen at 1250° C. for 15 minutes. The high frequency properties of the sintered body are indicated in numerical values in Table I under No. 2. By way of comparison this Table I indicates under No. 1 the optimum values of the corresponding properties of the known isotropic compound:

$$Ba_3Co_{0.725}^{II}Zn_{1.275}Fe_{24}^{III}O_{41}$$

hitherto attained.

When the final grinding was performed in acetone and when the filtered and dried powdery substance was compressed in a molding die consisting of non-ferromagnetic steel arranged between the pole pieces of an electromagnet, an anisotropically shaped body with a degree of orientation of 0.7 determined radiographically was obtained (see Lotgering: Journal of Inorganic Nuclear Chemistry 9, 113, 1959), which body had the properties expressed numerically in Table I under No. 3.

TABLE I

| No. | Frequency | 100 mHz. | 300 mHz. | 500 mHz |
|---|---|---|---|---|
| 1 | $\mu'$ | 16.3 | 12.7 | 9.1 |
|   | tan δ | 0.098 | 0.475 | 0.813 |
|   | $\mu'Q$ | 166 | 27 | 11 |
| 2 | $\mu'$ | 15.2 | 16.3 | 18.0 |
|   | tan δ | 0.016 | 0.061 | 0.128 |
|   | $\mu'Q$ | 924 | 266 | 141 |
| 3 | $\mu'$ | 19.9 | 21.4 | 24.0 |
|   | tan δ | 0.015 | 0.065 | 0.133 |
|   | $\mu'Q$ | 1320 | 327 | 180 |

EXAMPLE 2

A mixture of iron oxide, $Fe_2O_3$, barium carbonate, $BaCO_3$, cobalt carbonate, $CoCO_3$, and titanium dioxide, $TiO_2$, having such a composition that the quantities of metals have the ratio like in the compound of the composition according to the formula:

$$Ba_3Co_{2.75}^{II}Ti_{0.75}^{IV}Fe_{22.5}^{III}O_{41}$$

was ground in a ball mill in alcohol for 15 hours. The solid substance was then filtered off, dried and presintered twice in air at 1300° C. for one hour, while in the interval between the two presintering processes grinding was resumed. After the second presintering the substance was again ground for 15 hours, after which a molded body is made by compression from the resultant powder, which body was sintered in pure oxygen at 1250° C. for 15 minutes. The high-frequency properties of the magnetically isotropic sintered body thus obtained are indicated in numerical form in Table II under No. 5. By way of comparison this Table II indicates under No. 4 the optimum values of the corresponding properties of the known isotropic compound:

$$Ba_3Co_2^{II}Fe_{24}^{III}O_{41}$$

so far obtained.

TABLE II

| No. | Frequency | 100 mHz. | 300 MHz. | 500 MHz. |
|---|---|---|---|---|
| 4 | $\mu'$ | 8.5 | 10 | 11 |
|   | tan δ | 0.03 | 0.08 | 0.2 |
|   | $\mu'Q$ | 270 | 125 | 55 |
| 5 | $\mu'$ | 6.5 | 6.5 | 6.8 |
|   | tan δ | 0.005 | 0.015 | 0.044 |
|   | $\mu'Q$ | 1410 | 422 | 154 |

What is claimed is:

1. A ferrimagnetic material for use at frequencies of 50 mc./sec. and higher consisting essentially of crystals having a composition $$Ba_{3-a-b-c}Sr_aPb_bCa_cMe_{(2-d)}^{II}Co_{(d+e)}^{II}Ti_e^{IV}Fe_{(24-2e)}^{III}O_{41}$$

wherein $Me^{II}$ is a bivalent metal selected from the group consisting of $Mn^{II}$, $Fe^{II}$, $Ni^{II}$, $Cu^{II}$, Zn, Mg, and the bivalent metal complex $Li^I + Fe^{III}/2$ $$0 \leq a \leq 1$$
$$0 \leq b \leq 0.6$$
$$0 \leq c \leq 0.3$$
$$0.5 \leq d \leq 2$$
$$0.1 \leq e \leq 2.0$$

said crystals having a structure, the elementary cell of which has in the hexagonal system a c-axis of about 52.3 A. and an a-axis of about 5.9 A., and a preferred plane of magnetization said material having a higher resonance frequency, a lower loss factor (tan δ) and a higher quality factor ($\mu'Q = \mu'/\tan δ$, $\mu'$ being the initial permeability) at a given frequency than a comparable material without Ti.

2. A ferrimagnetic body consisting of a coherent body of material as defined in claim 1, the crystals of said material being magnetically oriented with their basal planes parallel to one another.

References Cited

UNITED STATES PATENTS

| | | | |
|---|---|---|---|
| 2,960,471 | 11/1960 | Gorter | 252—62.59 |
| 2,977,312 | 3/1961 | Gorter et al. | 252—62.63 |
| 3,046,227 | 7/1962 | Gorter et al. | 252—62.63 |
| 3,072,575 | 1/1963 | Gorter et al. | 252—62.63 |

TOBIAS E. LEVOW, Primary Examiner

R. D. EDMONDS, Assistant Examiner

U.S. Cl. X.R.

252—62